United States Patent [19]

Tamas

[11] 4,055,260
[45] Oct. 25, 1977

[54] BATTERY EXTRACTOR FOR VEHICLES
[75] Inventor: Attila J. Tamas, Lexington, Ky.
[73] Assignee: Clark Equipment Company, Buchanan, Mich.
[21] Appl. No.: 705,660
[22] Filed: July 15, 1976
[51] Int. Cl.² .................................................. B65G 67/42
[52] U.S. Cl. ......................................... 214/44 R; 104/34
[58] Field of Search .............. 214/38 R, 38 B, 38 BA, 214/38 BB, 38 D, 41, 44, 382, 506; 254/113, 119, 132; 74/516, 518, 522; 104/34; 180/68.5

[56] References Cited
U.S. PATENT DOCUMENTS

| 1,506,848 | 9/1924 | Mancha | 104/34 |
| 1,566,089 | 12/1925 | Harding | 104/34 |
| 2,360,799 | 10/1944 | Slingsby | 214/506 |
| 2,447,435 | 8/1948 | Settle | 214/382 X |
| 2,725,946 | 12/1955 | Welter | 214/506 X |
| 3,327,875 | 6/1967 | Goodacre | 104/34 |

Primary Examiner—Albert J. Makay
Attorney, Agent, or Firm—John C. Wiessler

[57] ABSTRACT

A device for removing and inserting traction drive batteries in lift trucks, the device being supported upon the floor aside the lift truck and engageable with a body portion thereof for maintaining a fixed position in relation to the truck during operation of the device. A handle bar lever arm is pivoted from the base and connectible by means of a ratchet bar to a side of the battery for extracting or inserting the battery from or in a truck compartment by a succession of movements in which the lever arm is successively adjusted about its base pivot to engage different ones of a plurality of longitudinally spaced notches in the ratchet bar for moving the battery in or out of the compartment.

12 Claims, 4 Drawing Figures

BATTERY EXTRACTOR FOR VEHICLES

BACKGROUND OF THE INVENTION

The field of art to which the invention pertains includes battery extractors for vehicles.

In certain types of battery powered vehicles, such as electric lift trucks in which traction drive batteries are located in the body of the truck for removal and insertion through side panel openings thereof, it has been a problem to conveniently handle the battery which may weigh several hundred pounds and which must be periodically extracted partially for inspection or entirely for recharging at which time pre-serviced batteries may be inserted so that the truck is seldom out of service.

SUMMARY

My invention includes a longitudinally extending ratchet-like member having a plurality of spaced openings lengthwise thereof successively engageable by an operator manipulated elongated handle operatively connectible to a side of the battery for extracting or inserting the battery from or in the battery compartment in successive increments as the lever is successively adjusted to different ones of the spaced openings and is pivoted to actuate the ratchet member and the battery when thus adjusted.

It is a primary object of the invention to provide an improved means of relatively simple and low-cost construction for moving traction drive batteries in and out of vehicular battery compartments.

DETAILED DESCRIPTION

Figure 1:
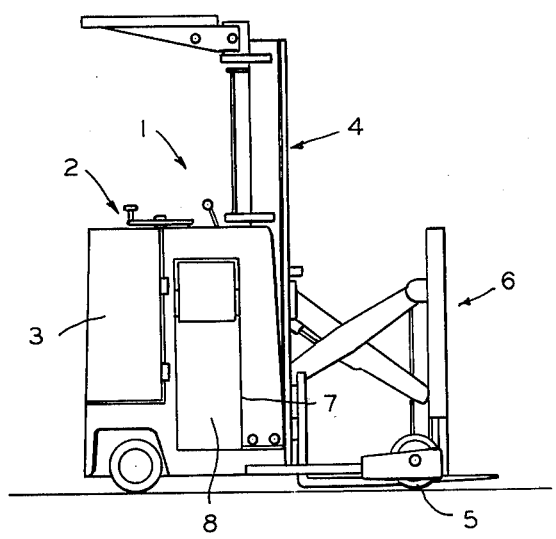
FIG. 1 is a side view of a battery powered lift truck.

Referring now to FIG. 1, a stand-up rider type battery powered lift truck 1 is illustrated which has an operator's compartment 2 located in a main body 3, an upright assembly 4 mounted at the forward portion between outrigger wheels 5 and rear drive-steer and idler wheels, a load handling reach attachment mounted on the upright, and a transversely extending battery compartment 7 which extends through the body of the truck for housing a main drive or traction battery 8.

Figure 2:
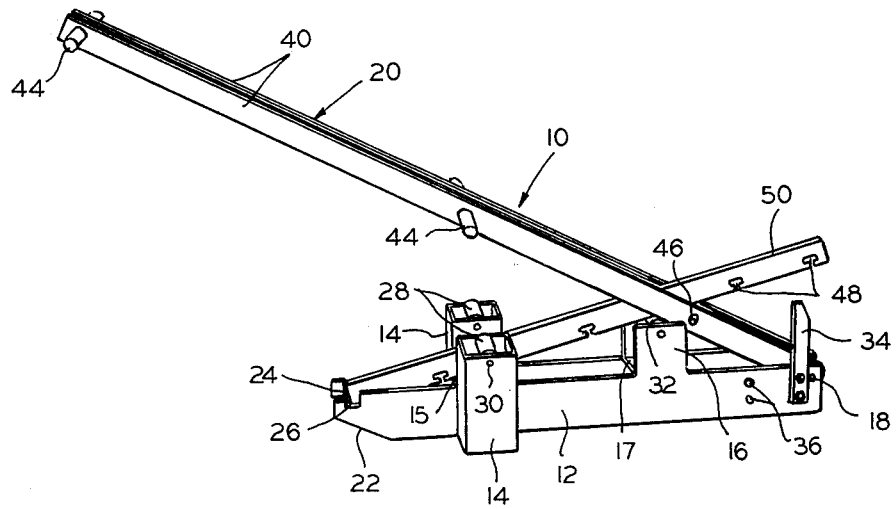
FIG. 2 is a view in perspective of my battery extractor device shown in a stored position.

My battery extractor device is shown generally at numeral 10 in FIG. 2. It comprises a generally U-shaped fabricated elongated base member 12 adapted to be supported on the floor by the bridge portion 13 of the base member, and having secured to the sides thereof two laterally spaced box-shaped roller housings 14 in the forward portion having a strengthener bridge plate 15 secured to the sides of base member 12, a single centrally located U-shaped roller housing 16 having a bridge plate 17 secured to the sides of the base member in the rear portion, a transverse pin 18 mounted in openings formed in the upper rear corner portions of the sides of the base member on which is mounted a rotatable actuator handle bar and arm assembly 20, an open and upwardly tapered lower forward end 22 having a reinforcing rib 24 and a pair of transversely spaced notches 26 formed in the upper forward corner edges of the sides of the base member. A pair of rollers 28 are mounted for rotation in housings 14 at a predetermined height on pins 30 which are supported in coaxial openings in the sides of the housings, as shown, the rollers having peripheral portions protruding above the housings in a common substantially horizontal plane with a third roller 32 similarly mounted in housing 16. An upwardly extending stop member 34 may be mounted on a pair of bolts in the side of the base member for identifying for the operator the desired position of extraction of a battery for servicing, as will be described below. One or more additional pair of openings 36 may be provided in the side of the base member for adjusting stop member 34 to different locations longitudinal of the base member.

The handle assembly 20 comprises a pair of transversely spaced parallel bar members 40 mounted pivotally at the bottom on pin 18. A sleeve member 42 between the bars 40, is mounted on pin 18 and a pair of longitudinally spaced handle members 44 extend through and support bars 40 in parallel spaced relation. A pin 46 extends through the bar members and is adapted to engage any selected one of a plurality of notches 48 which are located in longitudinally spaced relation in the lower edge of an adjustable battery actuator ratchet bar 50. The bar 50 is adapted to be manually adjusted as desired to engage any one of notches 48 with pin 46. The device is shown in a stored position in FIG. 2 with bar 50 extending over roller 32, having one of notches 48 in registry with pin 46 and extending downwardly and forwardly for support upon plate member 15.

Figure 4:
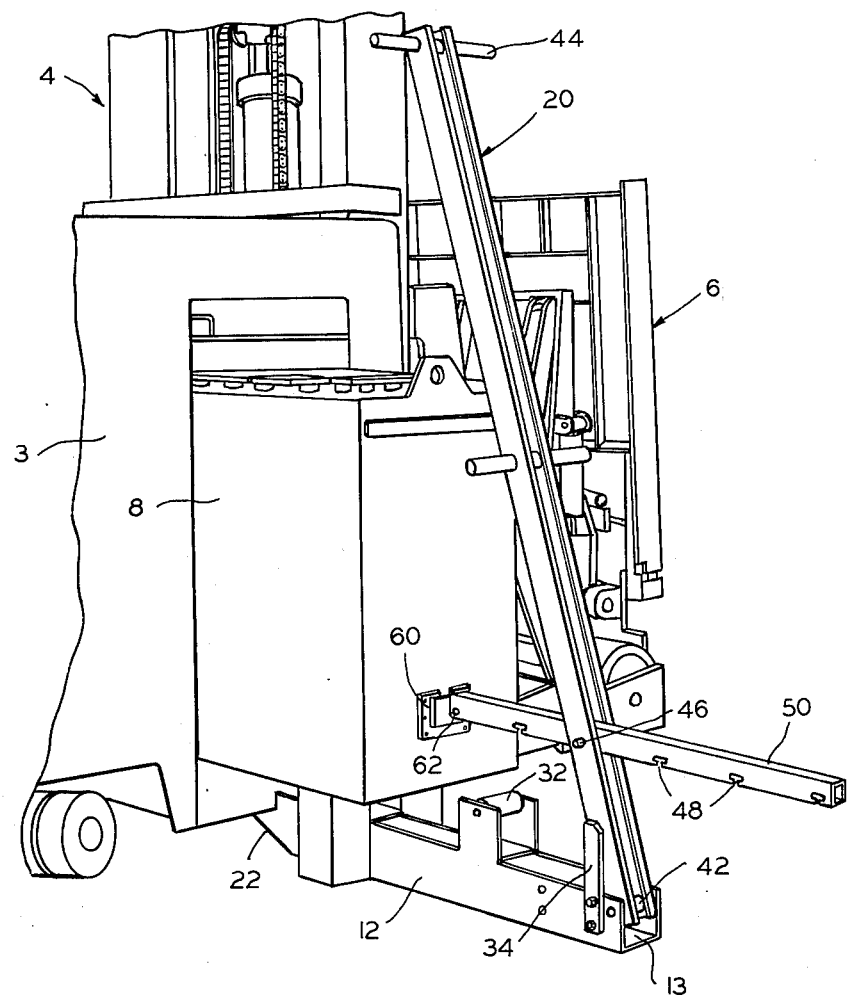
FIG. 4 is a partial view of the lift truck showing the battery partially extracted.
Figure 3:
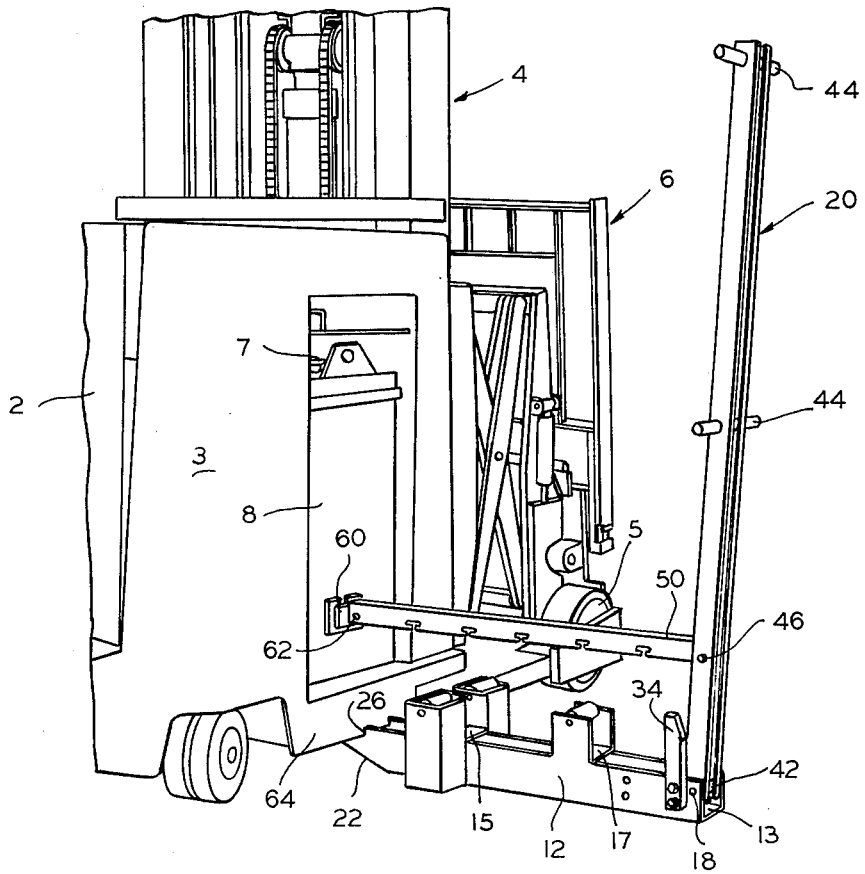
FIG. 3 is a partial view in perspective of the lift truck shown in FIG. 1 having my battery extractor device connected to the traction drive battery of the truck and to the side frame thereof preparatory to extracting the battery from the battery compartment.

Referring to FIGS. 3 and 4, a bracket 60 is secured at each opposite end of the battery and has a portion adapted to register with a pin 62 which is inserted through an opening in the forward end of actuator bar 50. Base member 12 may be connected to a side frame member 64 of the lift truck at one or the other sides thereof by having an operator grasp the lower one of handles 44 and rotate the entire device forwardly in the direction of the truck so that the tapered forward edges 22 of the base member are moved downwardly until notches 26 clear the lower edge of truck frame member 64, at which location the device may be pushed a short distance forwardly and pivoted rearwardly to a floor supported position as illustrated, thus effecting registry between the notches and the truck frame member. Such engagement between notches 26 and frame member 64 prevents movement of the base member of the device both towards the truck during battery removal and away from the truck during reinsertion of the battery.

Depending upon the length of the battery and the distance it must be actuated outside the battery compartment for servicing and the like, determines the number of adjustments to be made as between the handle assembly and notches 48 of actuator bar 50 as an operator extracts the battery from the compartment onto rollers 28 and 32 by successively actuating the handle bar 20 in a clockwise direction, as shown, from a forward position. The handle bar may be adjusted from one notch to another by lifting bar 50 to disengage it from pin 46 and then sliding the handle counterclockwise, for example, along the lower edge of bar 50 to engage the next forward notch. Of course, if desired, a notch may be skipped by holding the bar 50 elevated while rotating handle 20 to an alternate forward notch, all as will be apparent from a consideration of FIGS. 3 and 4. Normally handle 20 is actuated from a forward position as shown in FIG. 4, in which it may be adjusted to the penultimate forward notch, to any convenient clockwise position beyond that shown in FIG. 3, depending upon the height and convenience of the operator, but, preferably less than that distance which would bring the lower edge of bar 50 into contact with the roller 32.

It will be understood that my device greatly reduces the effort required to remove an electric truck battery from the truck compartment so that an operator can easily perform either maintenance or complete removal thereof while having control of the battery at all times. Such batteries ordinarily weigh from 1200 to 2300 lbs. and must be periodically serviced. The batteries are normally mounted upon rollers inside the battery compartment, and require a "break-away" force of from 75 to 700 lbs. On the other hand, if the rolling resistance in the battery compartment is very low the control of the rolling speed of the battery is a problem, which is readily controlled by my device, as will be apparent.

It will be appreciated also by persons skilled in the art that the device may be designed for partial removal for battery inspection only, in which event the device would be relatively short for extracting one-half only of the battery from either side of the truck, or it may be designed to be a longer length so that the battery can be completely removed from the truck and stored on the device while a new battery is inserted and the removed battery is recharged, for example.

It will be understood by those skilled in the art that various changes in the structure and relative arrangement of parts may be made without necessarily departing from the scope of my invention.

I claim:

1. A battery extractor comprising an elongated base assembly adapted to abut at one end thereof the side of a vehicle, an elongated actuator handle bar pivoted from the end of the base assembly opposite the end which abuts the vehicle, an elongated ratchet bar connectible to a battery in a battery compartment of the vehicle at one end and to said handle bar at a plurality of adjustment positions thereof, said ratchet bar extending above and longitudinally of the base assembly and said handle bar being manually actuatable in both directions about its pivot connection to said base assembly at each adjustment position of said ratchet bar for extracting and inserting the battery from and into the battery compartment, and wherein said handle bar includes a pair of elongated side members having an opening therebetween in the area of said ratchet bar, a member connecting the sides of said handle bar through said opening, said ratchet bar having a plurality of notches spaced longitudinally of the lower side thereof engageable successively by said connecting member, said handle bar being pivotable in said both directions at each position of engagement with said ratchet bar, and wherein the remote end of said ratchet bar is connected to battery bracket means, successive pivotal movement in one direction from successive positions of adjustment of said handle bar in relation to said ratchet bar effecting an extraction of the battery from the vehicle onto said base assembly.

2. A battery extractor as claimed in claim 1 wherein said base assembly includes elevated roller means for supporting the battery on the base assembly during extraction and insertion thereof.

3. A battery extractor as claimed in claim 1 wherein the vehicle is a lift truck having a battery mounted in a compartment transverse of the truck, said battery extractor being operative in a generally transverse position to the truck in line with the battery compartment.

4. A battery extractor as claimed in claim 1 wherein stop means is adapted to be mounted on said base assembly at different longitudinal locations adjacent the handle bar end of the base assembly for limiting variously the distance of extraction of the battery from the vehicle.

5. A battery extractor comprising an elongated base assembly adapted to abut at one end thereof the side of a vehicle, an elongated actuator handle bar pivoted from the end of the base assembly opposite the end which abuts the vehicle, an elongated ratchet bar connectible to a battery in a battery compartment of the vehicle at one end and to said handle bar at a plurality of adjustment positions thereof, said ratchet bar extending above and longitudinally of the base assembly and said handle bar being manually actuatable in both directions about its pivot connection to said base assembly at each adjustment position of said ratchet bar for extracting and inserting the battery from and into the battery compartment, the vehicle abutting end of said base assembly including means enabling the base assembly to be tilted upwardly at the handle bar end thereof for insertion of the opposite end beneath a side portion of the vehicle, lowering thereof from said tilted position effecting a connection of the base assembly to the side of the vehicle preventing longitudinal movement of the base assembly in either direction during extraction and insertion of a battery.

6. A battery extractor as claimed in claim 5 wherein said latter means comprises an upwardly and longitudinally tapered lower end of the base assembly and notch means in the upper side thereof for engaging the side of the vehicle.

7. A battery extractor as claimed in claim 5 wherein the vehicle is a lift truck having a battery mounted in a compartment transverse of the truck, said battery extractor being operative in a generally transverse position to the truck in line with the battery compartment.

8. A battery extractor as claimed in claim 5 which includes an upper transverse handle on said handle bar for manipulating said bar pivotably and a lower transverse handle for tilting said base assembly for connection with the side of the vehicle.

9. A battery extractor as claimed in claim 5 wherein said handle bar includes a pair of elongated side members having an opening therebetween in the area of said ratchet bar, a member connecting the sides of said handle bar through said opening, said ratchet bar having a plurality of notches spaced longitudinally of the lower side thereof engageable successively by said connecting member, said handle bar being pivotable in said both directions at each position of engagement with said ratchet bar.

10. A battery extractor as claimed in claim 9 wherein the vehicle is a lift truck having a battery mounted in a compartment transverse of the truck, said battery extractor being operative in a generally transverse position to the truck in line with the battery compartment.

11. A battery extractor as claimed in claim 10 including upper and lower transverse handles on said handle bar for manipulating said bar pivotably and for tilting said base assembly for connection with the side of the vehicle, respectively.

12. A battery extractor as claimed in claim 5 wherein the remote end of said ratchet bar is connected to battery bracket means, successive pivotal movement in one direction from successive positions of adjustment of said handle bar in relation to said ratchet bar effecting an extraction of the battery from the vehicle onto said base assembly.

* * * * *